Figure 4:
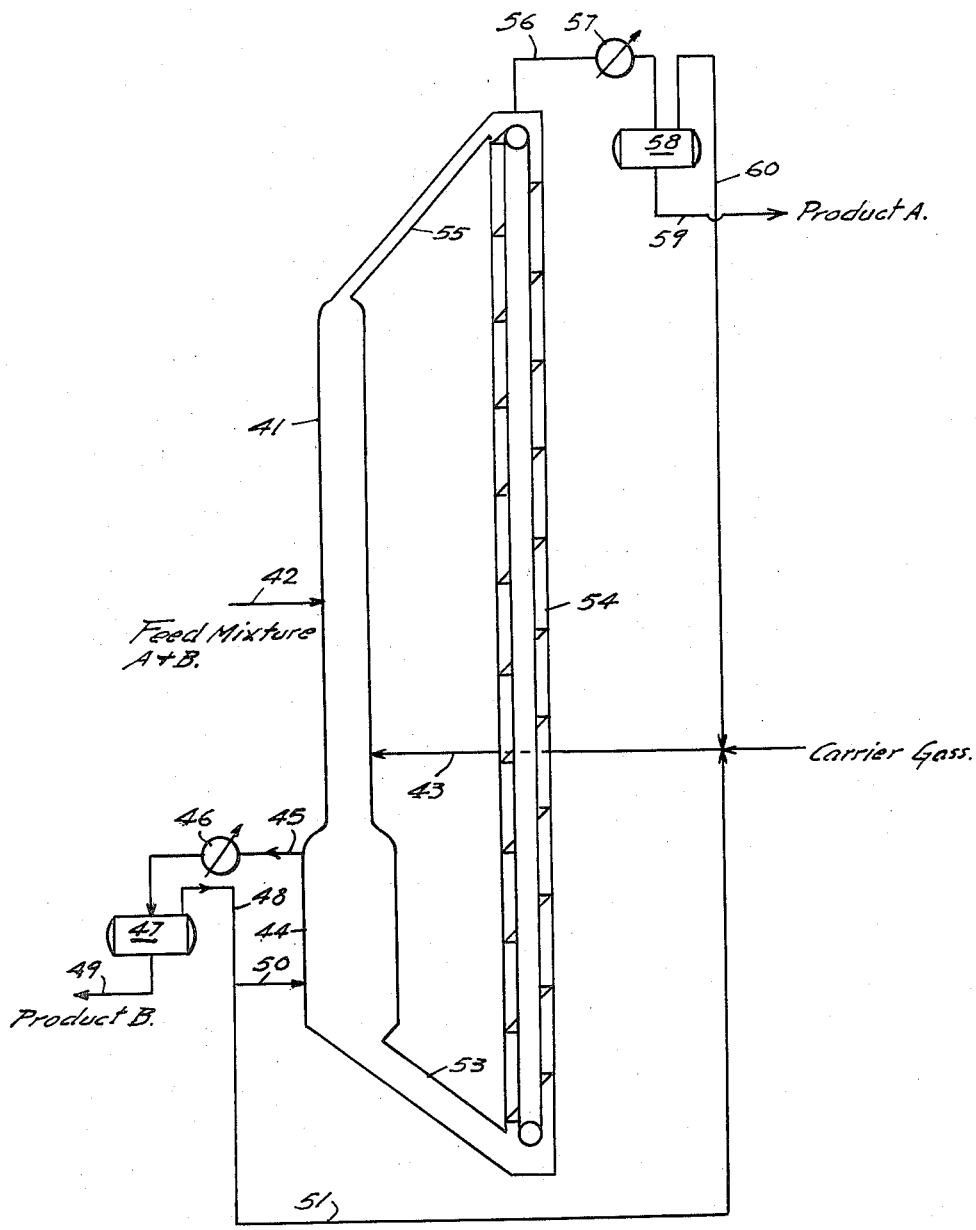

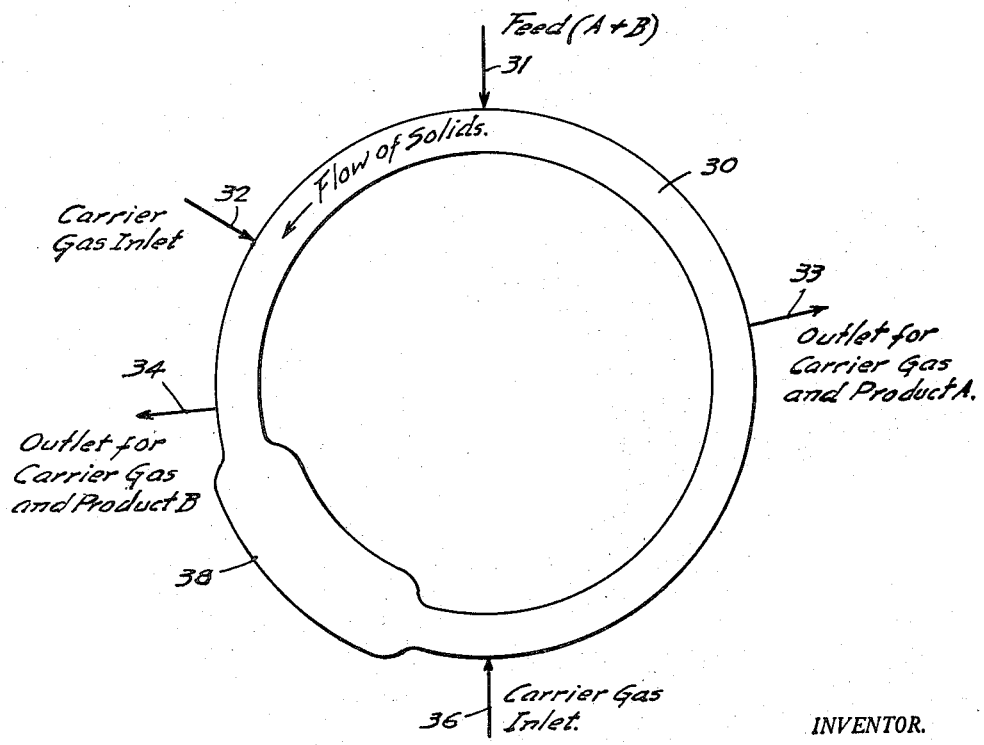

United States Patent Office 2,893,955
Patented July 7, 1959

2,893,955

CONTINUOUS SEPARATION PROCESS

Norman D. Coggeshall, Verona, Pa., assignor to Gulf Research & Development Company, Pittsburgh, Pa., a corporation of Delaware Application May 11, 1956, Serial No. 584,367

7 Claims. (Cl. 208—310)

This invention relates to a method of separating fluid mixtures and more particularly to a method in which a fluid mixture stream is continuously separated by partition chromatography.

It is known that the principles of partition chromatography can be applied to the batch separation of fluid mixtures. See for example, the article by D. H. Lichtenfels et al., Analytical Chemistry, volume 27, Number 10, October 1955, pages 1510–13. This article describes the separation of a fluid mixture by gas-liquid partition chromatography for analytical purposes. In the method described a sample of a volatile mixture to be separated and analyzed is injected into the end of a narrow column packed with an inert, granular material on which has been deposited a coating of a high boiling organic liquid such as dioctyl phthalate. The column is then eluted with an inert carrier gas such as helium or nitrogen. The individual components of the volatile mixture to be analyzed partition between a gas phase in the vapor space between particles and a liquid phase absorbed in the high boiling organic solvent coating of the particles. This causes the components of the mixture to move forward with individual velocities which are less than that of the carrier gas. The velocity with which a particular component moves is dependent upon its partition coefficient which, for a compound injected into a gas-liquid partition chromatography column can be defined as the ratio of the concentration of the compound in the stationary liquid phase to its concentration in the moving gas phase. Since the partition coefficient varies for different compounds, the components of the mixture move through the column at different speeds and, if the column is long enough, the components emerge one by one from the column, usually in the order of boiling points for a homologous series. In the analytical procedure described in the above article the separated components are detected as they emerge from the partition column by means of a thermal conductivity cell.

The batch separation of fluid mixtures by partition chromatography has proved to be valuable for analytical purposes. I have now discovered a method and an apparatus by means of which the principles of gas-liquid partition chromatography can be used for continuous separation of a fluid mixture stream. My apparatus and process can be used for continuous analysis or for the continuous recovery of desired products from a fluid mixture. The process of my invention in general comprises flowing in a cyclic path a stream of solid particles coated with a partitioning liquid, introducing a stream of fluid feed mixture to be separated into said stream of solid particles and introducing a first stream of carrier gas into the flowing stream of solid particles at a point in the cyclic path downstream from the point of introduction of the feed mixture whereby a portion of the carrier gas flows countercurrently to the flowing stream of particles and another portion flows concurrently therewith, the rate of flow of the stream of solid particles being selected in relation to the partition coefficients of components of the feed mixture and in relation to the carrier gas countercurrent flow rate so that one component of the feed mixture of relatively low partition coefficient is caused to move with the carrier gas countercurrently to the direction of flow of the stream of solid particles and another component of higher partition coefficient is caused to move in the opposite direction concurrently with the stream of solid particles. At a point further along the cyclic path of solid particles flow a gaseous stream comprising carrier gas is withdrawn from the stream of solid particles. Still further along the path of solid particles flow a second stream of carrier gas is introduced into the stream of solid particles whereby a portion thereof flows countercurrently to the stream of solid particles and is withdrawn from the stream of solid particles with said component of higher partition coefficient at the last-mentioned point of withdrawal of a gaseous stream and another portion of said second stream of carrier gas flows concurrently with the stream of solid particles. Between the point of introduction of the second stream of carrier gas and the point of introduction of the feed mixture another gaseous stream comprising carrier gas and the component of the feed mixture having a relatively low partition coefficient is withdrawn from the stream of solid particles.

An apparatus of my invention in which my process can be carried out comprises in general an elongated chamber adapted for flow therethrough (preferably gravity flow) of a stream of solid particles coated with a partitioning liquid and means for conveying the stream of solid particles from the lower end of said chamber to the upper end thereof, the elongated chamber and the conveying means thereby forming a continuous cyclic path for flow of the stream of solid particles. The cyclic path is provided with inlet and outlet conduits for fluid streams comprising a feed inlet means, at least two gas inlets and at least two gas outlets. Along said cyclic path each gas inlet is followed by a gas outlet and each gas outlet is followed by a gas inlet whereby there is concurrent flow of carrier gas and solid particles in each section of the cyclic path following a gas inlet and before a gas outlet and countercurrent flow in each section following a gas outlet and before a gas inlet. In the preferred apparatus of the invention the feed inlet means is positioned in a section of countercurrent flow of carrier gas and solid particles of the cyclic path and an enlarged cross-sectional area of the elongated chamber is provided in the countercurrent section next after the countercurrent section in which the feed inlet is positioned.

To describe further the process and apparatus of the invention reference will be made to the drawings, of which Figures 1 and 2 are vector diagrams of velocities and directions of flow in the separation of a two-component mixture by partition chromatography with a stationary bed and a moving bed of solid particles respectively. Figure 3 is a highly schematic flow diagram of my continuous, moving bed process and Figure 4 is a diagrammatic illustration of one form of apparatus of my invention.

I have explained above that a mixture of fluids injected into a partition chromatography column will separate in components moving at different speeds through the column because of their differences in partition coefficients. The partition coefficient of a compound is the ratio of its concentration in the liquid phase formed as a coating on the solid particles of the partition column to its concentration in the gas phase formed by the carrier gas flowing through the column. The process of the invention uses a moving stream of solid particles coated with a partitioning liquid and relies on the fact that the components of a mixture flow through a partition chamber at different velocities depending on their partition coefficients, whereby to cause one component of the mixture to move in the direction of flow of the carrier gas and countercurrently to the direction of flow of the solid particles and another component to move in the opposite direction with the moving solid particles. Figures 1 and 2 illustrate this phenomenon vectorially. In Figure 1, numeral 10 designates a partition chamber containing a stationary body of liquid-coated solid particles. The vector $V_g$ represents the direction and velocity of movement of a carrier gas flowing through the partition chamber. $V_A$ represents the direction and velocity of movement of a component A of a binary fluid mixture of compounds A and B that is introduced into the chromatographic chamber. $V_B$ represents the direction and velocity of compound B of the feed mixture.

Figure 2 shows vectorially the result of moving the body of solid particles countercurrently to the direction of carrier gas flow and at a velocity $V_S$ which is opposite in direction to $V_A$ and $V_B$ and numerically less than $V_A$ but greater than $V_B$. The result is that compound A continues to move in the direction of the carrier gas but at an absolute velocity which is less than its original velocity as shown in Figure 1 by the amount of the negative velocity of the moving stream of solid particles. Compound B reverses its direction of flow and flows in the direction of the flow of the stream of moving particles at a velocity equal to the algebraic difference between its original velocity $V_B$ and the velocity of the moving stream of solid particles.

In accordance with my invention I take advantage of the phenomenon discussed above to separate continuously a mixture such as a mixture of compounds A and B whereby compound A is continuously removed from the separation system at one point and compound B at another point. Figure 3 shows in a highly diagrammatic manner the flow of my process. The annulus 30 represents the cyclic path of a moving stream of solid particles coated with a non-volatile partitioning solvent. The solid particles and the partitioning liquid can be any of the materials which are known for use in fixed bed partition chromatographic columns. For example, the solid particles can be granular kieselguhr. The partitioning liquid can be a high boiling point organic solvent such as dinonyl phthalate. In the process of the invention the stream of solid particles coated with partitioning liquid is caused to circulate, for example, in a counterclockwise direction in the flow diagram of Figure 3, by any suitable procedure for causing cyclic flow of particulate solids. Specific ways of providing this flow will be described in more detail hereinafter.

In accordance with the invention a feed mixture of compounds A and B is continuously introduced into the body of solid particles by means of feed inlet 31. A carrier gas such as nitrogen is introduced at carrier gas inlet 32. The stream of solid particles is flowed in a counterclockwise direction at a velocity relative to the velocities of compounds A and B under the impetus of the carrier gas at its particular clockwise velocity between 31 and 32 whereby to cause component A, the compound of lower partition coefficient of the two components, to move in a clockwise direction with carrier gas while component B, the compound of higher partition coefficient, moves counterclockwise with the stream of solid particles, in accordance with the principle suggested above in connection with Figures 1 and 2.

The carrier gas entering via inlet 32 flows in two directions. One portion flows clockwise and countercurrently to the direction of flow of the stream of solid particles, carrying with it compound A of the feed mixture. Another portion flows counterclockwise in the direction of flow of the stream of solid particles. The portion of carrier gas flowing in a clockwise direction is withdrawn at the carrier gas and product outlet 33 carrying with it substantially all of compound A of the feed mixture. The other portion of carrier gas introduced via line 32 is withdrawn substantially entirely via carrier gas and product outlet 34, carrying with it a portion of the more difficultly removable compound B.

A second stream of carrier gas is introduced to the system via carrier gas inlet 36. A portion of this carrier gas flows in a clockwise direction and is withdrawn through outlet 34 carrying with it the remainder of compound B. The other portion of the carrier gas introduced at inlet 36 flows in a counterclockwise direction and is withdrawn at outlet 33. In order to insure complete removal of the more difficultly removable compound B from the partitioning solids, the difference between the velocities of the streams of solid particles and the countercurrently flowing carrier gas between outlet 34 and inlet 36 can be increased. This can be done either by reducing the velocity of the solid stream in the specified interval or by increasing the velocity of the carrier gas or by doing both of these things. The velocity of the solids can be reduced by passing the stream of solids through a chamber of increased cross-sectional area as shown at 38 in the drawing, thereby reducing the linear velocity of the stream. The carrier gas introduced via inlet 36 can be introduced at a greater velocity than the carrier gas introduced at inlet 32.

The discussion above in connection with Figure 3 explains in general the flow of the various streams in my process and the selection of velocities for the solid particles and the carrier gas streams to provide a separation of compounds having different partition coefficients. Figure 4 shows diagrammatically a specific apparatus of my invention in which the process of my invention can be carried out, showing more particularly a specific means for providing continuous flow for a stream of solid particles and such commercially important features as means for recovering carrier gas from the product streams for return to the separation system.

The separation apparatus of Figure 4 comprises a main partition chromatographic chamber 41 which is arranged for gravity flow therethrough of the stream of solid particles coated with a partitioning liquid. At an intermediate point of the chamber 41 a feed inlet line 42 for the fluid mixture of A and B to be separated is provided. Below the feed inlet 42 a carrier gas inlet 43 enters the chamber. Below the carrier gas inlet 43 the cross-sectional area of chamber 41 is enlarged in section 44 thereof. At the upper end of enlarged section 44 is provided a fluid outlet line 45. The fluid outlet line 45 passes to means for separating carrier gas from the separation product B. This means can include a cooling means 46 for condensing the product B from the non-condensable carrier gas and a gas-liquid separation drum 47. A line 48 is provided for withdrawing carrier gas and a line 49 for withdrawing the condensed product B from drum 47. Line 48 divides into a line 50 which returns carrier gas to the lower end of section 44 of chamber 41 and a line 51 which returns another portion of carrier gas to the carrier gas inlet line 43.

The apparatus of the invention includes a means for delivering solid particles from the lower end of chamber 41 to the upper end thereof. In the apparatus illustrated in Figure 4 this means comprises the inclined conduits 53 and 55 and the vertical conduit 54 which contains an elevating or solids lifting means. The solids pass by gravity flow from the lower end of chamber 41 through conduit 53 to the elevating means enclosed in the conduit 54. This elevating means can take the form of a continuous chain drive, bucket-type elevator of well-known design enclosed in the sealed conduit 54. The elevating means delivers the stream of solid particles to the inclined conduit 55 through which the particles pass by gravity flow into the chamber 41.

A second gas outlet means is provided at the upper end of chamber 41, suitably at the top of conduit 54 in the form of the line 56. This line delivers carrier gas flowing upwardly from column 41 and from the solids elevating conduit 54 and vaporized separation product A to suitable means for separating carrier gas from the product. The separating means in the apparatus of Figure 4 comprises the cooler 57 and the separating drum 58. Condensed product A is withdrawn by line 59. Carrier gas is withdrawn by line 60 and is recirculated to the carrier gas inlet line 43.

The process of the invention is particularly suited for separating mixtures of volatile organic compounds such as the lower molecular weight components of petroleum oil, that is to say $C_{10}$ and lighter hydrocarbons. The process can also be applied to the higher molecular weight less volatile components of petroleum oil provided that conditions under which vaporization of the components of the mixture will occur are used. These conditions can include elevated temperature and/or reduced pressure. The partitioning liquid for coating the solid particles in my process can be selected from the many solvents that are suitable for use in partition chromatography. In some instances one particular partitioning liquid may be superior to another for separating a particular mixture. The partitioning liquid is applied as a surface coating to a granular solid material that forms the stream of solid particles in the process. Liquids that are most suitable for partition chromatography include high boiling organic solvents such as dioctyl phthalate, dinonyl phthalate, dioctyl sebacate, paraffin wax, silicone fluids, etc. It is also possible to use more volatile partitioning liquids in partition chromatography (for example, water) if any such liquids have particularly desirable solvent properties. When using a volatile partitioning liquid the carrier gas should be saturated with vapor of the partitioning liquid so that the liquid will not be removed from the solids by the carrier gas.

I have mentioned granular kieselguhr as an example of a suitable solid material for my process. As a general rule any of the granular solid materials used for partition chromatography can be used in my process, although since in my process a moving stream of particles is used the solids should be resistant to attrition. Preferably the solid particles are nonporous materials which are not chromatographically active adsorbents, as otherwise the effects of adsorption chromatography and partition chromatography would be superimposed upon each other and this might prevent the obtaining of sharply defined fractions.

The carrier gas for the process of the invention can be any inert gaseous material that can be separated readily from the separation products. Examples of suitable carrier gases include hydrogen, helium, nitrogen, etc.

In the specification and claims I have for convenience referred to compounds with high or low partition coefficients. The definitions are of course relative. What is meant by a compound of high or relatively high partition coefficient is one that is more strongly retained in the liquid phase coating on the solid particles than other components of the mixture and a component of low or relatively low partition coefficient is one that passes more readily than other components into the moving gas phase with the carrier gas.

A further understanding of the invention can be obtained from the following illustrative example of the separation of a binary mixture of hydrocarbons according to the process of the invention.

*Example*

A mixture of n-pentane and iso-pentane is separated by the process of the invention in an apparatus like that of Figure 4 comprising a principal chromatographic chamber 41, six feet in height and one foot in diameter, and having at its lower end an enlarged section 44, three feet in height and two feet in diameter. Granular kieselguhr is circulated through the apparatus at a rate to provide a linear velocity in section 41 of 0.4 foot per minute. The kieselguhr particles range in size from about 75 to 150 microns average diameter and are coated with a thin film of dioctyl phthalate as partitioning liquid. The weight ratio of the partitioning liquid to solid particles is approximately 1 to 2. The coated kieselguhr is maintained in chamber 41 with an overall density of approximately 0.3 gram per cc. The feed mixture of n-pentane and iso-pentane is continuously introduced via line 42. The carrier gas, helium, is introduced via line 43 at a temperature of 130° F. and the circulating stream of kieselguhr particles in the separation apparatus is maintained at a temperature of 130° F. The rate of flow of carrier gas in section 41 is adjusted so that the countercurrent flow relative to the coated kieselguhr is 126 cubic centimeters per minute per square centimeter of area in section 41 or, in other words, the linear velocity of the carrier gas flowing countercurrently to the stream of solids in section 41 is about 4.1 feet per minute relative to the stream of solids calculated on a free volume basis, i.e. the flow rate if no solids were present. Carrier gas and substantially pure n-pentane are withdrawn at the first gas outlet 45. The stream is cooled to a temperature of −94° F. in condenser 46 and the condensed n-pentane is withdrawn from drum 47 while carrier gas is returned by line 48 to the separation apparatus. Solids from the bottom of section 44 are continuously lifted by the bucket elevator in conduit 54 and flow back into the top of column 41. Carrier gas and the product iso-pentane are withdrawn via line 56 and cooled by condenser 57 to a temperature of −94° F. The condensed iso-pentane is withdrawn from the drum 58. The carrier gas is recirculated via line 60 and line 43 to the separation apparatus.

Obviously many modifications and variations of the invention as hereinbefore set forth may be made without departing from the spirit and scope thereof and therefore only such limitations should be imposed as are indicated in the appended claims.

I claim:

1. A method for continuously separating a fluid mixture by partition chromatography which comprises flowing in a cyclic path a stream of solid particles coated with a partitioning liquid, introducing a stream of fluid feed mixture into said stream of solid particles and introducing a first stream of carrier gas into the flowing stream of solid particles at a point in the cyclic path downstream from the point of introduction of the feed mixture whereby a portion of the carrier gas flows countercurrently to the flowing stream of particles and another portion flows concurrently therewith, the rate of flow of the stream of solid particles being selected in relation to the partition coefficients of components of the feed mixture and in relation to the carrier gas countercurrent flow rate so that a component of the feed mixture of low partition coefficient is caused to move with the carrier gas countercurrently to the flow of solid particles and another component of higher partition coefficient is caused to move in the opposite direction concurrently with the solid particles, at a point further along the cyclic path withdrawing a first gaseous stream from the stream of solid particles, still further along said cyclic path introducing a second stream of carrier gas whereby a portion thereof flows countercurrently to said stream of solid particles and is withdrawn with said component of higher partition coefficient at said point of withdrawal of the first gaseous stream and another portion thereof flows concurrently with the stream of solid particles, thereafter at a point further along the cyclic path between the point of introduction of the second stream of carrier gas and the point of introduction of the feed mixture withdrawing another gaseous stream comprising carrier gas and said low partition coefficient component of the feed mixture.

2. A method according to claim 1 in which the stream of solid particles is flowed along a section of the cyclic path between said point of withdrawal of a first gaseous stream and said point of introduction of the second stream of carrier gas at a lower linear velocity than along other sections of the path before and after said section.

3. A method according to claim 1 in which said second stream of carrier gas is introduced at a higher velocity than said first stream of carrier gas.

4. A method according to claim 2 in which said second stream of carrier gas is introduced at a higher velocity than said first stream of carrier gas.

5. The method of effecting a separation by partition chromatography of substances having partition coefficients greater than and less than a predetermined value comprising the steps of moving a partitioning medium in one direction through a column at a constant velocity relaitve thereto while moving a carrier gas through the column in the opposite direction and at a constant velocity relative thereto, introducing a mixture of the substances to be separated into the column, said velocities being selected so that substances having a partition coefficient higher than the predetermined value move relative to the column in one direction, with the substances having a partition coefficient lower than the predetermined value moving relative to the column in the opposite direction.

6. A method for continuously separating a fluid mixture by partition chromatography which comprises continuously moving a partitioning medium along a prescribed course, introducing a stream of fluid feed mixture into said moving partitioning medium and introducing a stream of carrier gas into said moving partitioning medium at a point along the course of the latter downstream from the point of introduction of the feed mixture, the rate of movement of said partitioning medium being selected in relation to the partition coefficients of components of the feed mixture and in relation to the carrier gas flow rate so that a component of the feed mixture of low partition coefficient is caused to move with the carrier gas countercurrently to the flow of the partitioning medium and another component of higher partition coefficeint is caused to move concurrently with the partitioning medium, and recovering from said carrier gas said component of low partition coefficient and from said partitioning medium the component of higher partition coefficient.

7. In the separation of fluid mixtures by partition chromatography in which a fluid mixture is introduced into a body of solid particles having thereon a liquid coating and in which a carrier gas is caused to flow through said body of coated solid particles whereby components of said mixture are caused to partition between the liquid coating of said solid particles and said carrier gas, the improvement which comprises causing said body of coated solid particles to move with a velocity selected to cause one component of said mixture to move in one direction with said carrier gas and another component having a higher partition coefficient than said first-mentioned component to move in another direction with said coated solid particles.

References Cited in the file of this patent
UNITED STATES PATENTS

| | | |
|---|---|---|
| 2,631,727 | Cichelli | Mar. 17, 1953 |
| 2,731,149 | Findlay | Jan. 17, 1956 |
| 2,743,818 | Higuchi | May 1, 1956 |

OTHER REFERENCES

Practical Chromatography, Brimley and Barrett, pp. 61, 71–77, Reinhold Pub. Co. (1954).

Karnofsky: "Let's Look at Selective Adsorption," Chemical Engineering, 1954, vol. 61, No. 9, pp. 189–192.